Dec. 3, 1963     C. W. RIPPIE     3,112,565
METHOD FOR MANUFACTURING CLAD STAINLESS STEEL PLATES
Filed Jan. 27, 1961
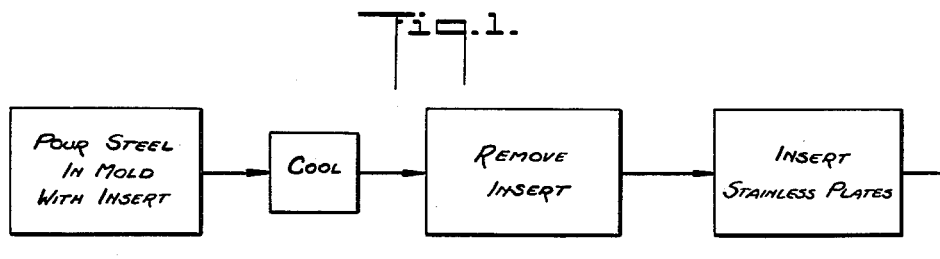
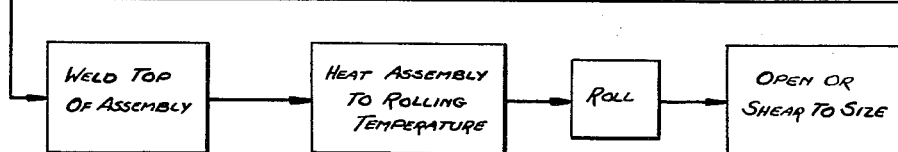
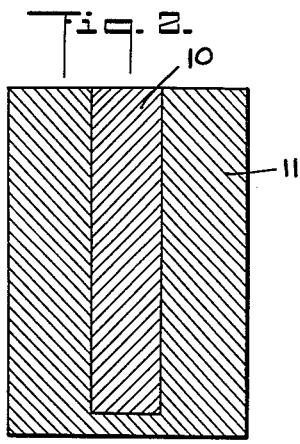
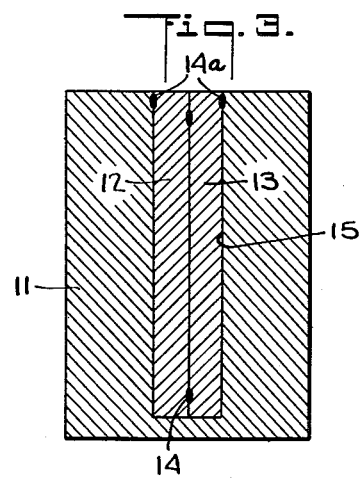
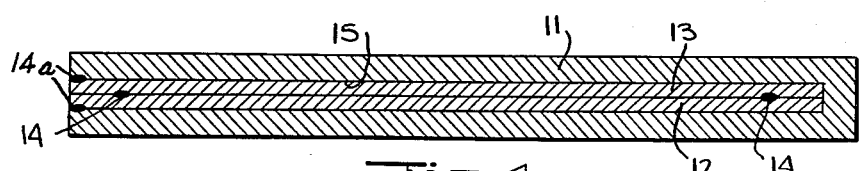
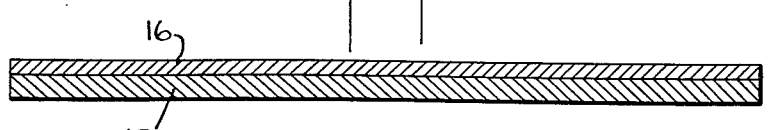
INVENTOR.
CHARLES W. RIPPIE
BY
Kenyon & Kenyon
ATTORNEYS

United States Patent Office 3,112,565
Patented Dec. 3, 1963

3,112,565
METHOD FOR MANUFACTURING CLAD STAINLESS STEEL PLATES
Charles W. Rippie, 102 Bellefonte Drive, Ashland, Ky.
Filed Jan. 27, 1961, Ser. No. 85,222
2 Claims. (Cl. 29—470.9)

This invention relates to improvements in the manufacture of clad stainless steel plates.

The use of carbon steel plates clad with stainless steel for corrosive service in the place of solid stainless steel is well known in the art.

On current method, for example, may be described as follows. Carbon steel plates are rolled to the required dimensions, cut and sand blasted. Then two nickel plated stainless steel plates separated by a parting compound are tack welded and placed between two larger carbon steel plates of the type described. This sandwich assembly is welded on the four sides comprising its periphery and soaked in furnaces to rolling temperatures. The assembly is then rolled to specific dimensions and opened to make two clad stainless steel plates. In the product, carbon steel comprises 80–90% of the thickness and stainless steel, the balance.

This process, however, requires approximately forty lifting operations in the course of manufacture of the clad stainless product.

It is an object of the present invention to reduce the number of operations and thus to reduce production costs.

It is a further object of this invention to conserve present strategic resources including nickel, chromium, Monel and other metals.

Briefly stated the improved method contemplates the use of a graphite insert or resin bonded sand core in the steel mold. Upon cooling, the graphite insert or resin bonded sand core is removed, and two stainless steel plates, tack welded together but coated with a parting compound on their common surfaces, are inserted in place of the core. The stainless plates are welded to the carbon steel casting, but only the top need be welded, instead of the four sides, or entire periphery of the assembly. After heating and rolling, the assembly is separated into two stainless clad plates and trimmed to size.

Referring now to the drawings:

FIG. 1 is a flow sheet illustrating the steps of the process.

FIG. 2 is an elevation in cross-section of a carbon steel casting provided with a core insert.

FIG. 3 shows a carbon steel casting welded to two stainless steel plates which are themselves welded to one another and inserted within the casting.

FIG. 4 shows the assembly of FIG. 3 after rolling.

FIG. 5 shows a clad steel plate after separation of the assembly of FIG. 4 and the trimming.

As shown in FIGS. 1–5, the method may be described by the following steps:

First, at the open hearth, pour molten steel through a bottom riser into a mold, provided with a graphite insert or resin bonded sand core 10. The resulting casting 11 is depicted in FIG. 2.

Second, allow to cool, and remove the insert or core 10.

Third, insert two stainless steel plates 12, 13 tack welded together at 14 but coated by a parting compound 15, into the mold cavity left by the insert or core. FIG. 3 shows the stainless plates tack welded to one another and inserted into the casting.

Fourth, weld the assembly at the upper portion wherein the stainless steel plates were inserted. FIG. 3 also shows the stainless plates welded to the casting along their exposed joint at 14a.

Fifth, heat the assembly to rolling temperature.

Sixth, roll the assembly to the desired dimensions. The rolled assembly is shown in FIG. 4.

Seventh, open the assembly and separate the stainless plates so that two carbon steel plates clad with stainless steel are provided. Other metallic clad steels are made similarly to the herein described stainless clad steels.

The clad stainless product may be sheared to proper size. See FIG. 5 in which is shown the stainless steel cladding 16 on the carbon steel plate 17.

The above described method may be arranged in the direct line of assembly and requires considerably fewer operations than present operations.

Those skilled in the art may be aware of possible variations in the above described method, which variations will not depart from the letter and spirit of the present invention.

What is claimed is:

1. A method for fabricating clad stainless steel plates comprising the steps, pouring carbon steel into a mold provided with a graphite or resin bonded sand insert so that said carbon steel surrounds said insert on the bottom and sides thereof, allowing to cool, removing said graphite or resin bonded sand insert and substituting therefor two abutting stainless steel plates having a layer of parting compound between the abutting surfaces, sealing the exposed periphery of said carbon steel and said stainless steel plates, heating the sealed assembly thus fabricated to rolling temperature, rolling said assembly to the dimensions desired, said temperature and rolling pressure being suffcient to weld the stainless steel to said carbon steel and separating the rolled assembly along the abutting surfaces of the two stainless steel plates.

2. A method for fabricating clad stainless steel plates comprising the steps, pouring carbon steel into a mold provided with a graphite or resin bonded sand core insert so that said carbon steel surrounds said insert on the bottom and sides thereof, allowing to cool, removing said insert or core and substituting therefor two abutting stainless steel plates tack welded together and coated with a parting compound at their abutting surfaces, sealing the joint of said carbon steel and said stainless steel plates by welding the exposed ends, heating the sealed assembly thus fabricated to rolling temperature, rolling said assembly to the dimensions desired said temperature and rolling pressure being sufficient to weld the stainless steel to said carbon steel and separating the rolled assembly along the abutting surfaces of the two stainless steel plates.

References Cited in the file of this patent

UNITED STATES PATENTS

| | | |
|---|---|---|
| 2,102,394 | Trembour | Dec. 14, 1937 |
| 2,416,400 | Mehl | Feb. 25, 1947 |
| 2,957,234 | Valyi | Oct. 25, 1960 |
| 3,061,924 | Brick et al. | Nov. 6, 1962 |